United States Patent
Huang et al.

(10) Patent No.: US 11,473,486 B2
(45) Date of Patent: Oct. 18, 2022

(54) FLUID CONNECTOR ASSEMBLY, LIQUID COOLING SYSTEM AND FLUID CIRCULATION SYSTEM

(71) Applicant: DELTA ELECTRONICS, INC., Taoyuan (TW)

(72) Inventors: Yu-Jei Huang, Taoyuan (TW); Yu-Hsien Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/306,866

(22) Filed: May 3, 2021

(65) Prior Publication Data

US 2021/0381421 A1 Dec. 9, 2021

Related U.S. Application Data

(60) Provisional application No. 63/035,845, filed on Jun. 8, 2020.

(30) Foreign Application Priority Data

Feb. 24, 2021 (CN) .......................... 202110208434.0

(51) Int. Cl.
*F01P 11/04* (2006.01)
*F16L 37/04* (2006.01)
*F01P 3/20* (2006.01)

(52) U.S. Cl.
CPC ................. *F01P 3/20* (2013.01); *F01P 11/04* (2013.01); *F16L 37/04* (2013.01)

(58) Field of Classification Search
CPC .. F16L 21/08; F16L 37/04; F01P 11/04; F01P 7/14
See application file for complete search history.

(56) References Cited

U.S. PATENT DOCUMENTS

| 2006/0192164 | A1 | 8/2006 | Korogi et al. | |
|---|---|---|---|---|
| 2007/0131783 | A1* | 6/2007 | Kempf | G05D 23/1346 236/12.1 |
| 2008/0036201 | A1* | 2/2008 | Ito | F16L 37/0885 165/172 |
| 2008/0283131 | A1* | 11/2008 | Etter | A47J 31/461 99/302 R |
| 2009/0230200 | A1* | 9/2009 | Kempf | E03B 7/09 137/337 |
| 2011/0260444 | A1* | 10/2011 | Lee | F16L 37/18 285/85 |
| 2013/0292591 | A1* | 11/2013 | Chang | F16L 37/413 251/149.6 |
| 2018/0172192 | A1* | 6/2018 | Doh | F16L 37/08 |

FOREIGN PATENT DOCUMENTS

TW M407761 U1 7/2011

* cited by examiner

*Primary Examiner* — Long T Tran
(74) *Attorney, Agent, or Firm* — CKC & Partners Co., LLC (57) ABSTRACT

A fluid connector assembly includes a housing, an elastic member and a floating component. The housing has an opening. The elastic member is disposed in the opening of the housing. The floating component is movably supported by the elastic member and includes a fluid passage and a first guiding structure. The fluid passage is configured to be connected to a fluid device. The first guiding structure is configured to engage with a second guiding structure of the fluid device.

20 Claims, 8 Drawing Sheets

FLUID CONNECTOR ASSEMBLY, LIQUID COOLING SYSTEM AND FLUID CIRCULATION SYSTEM

RELATED APPLICATIONS

This application claims priority to U.S. Provisional Application Ser. No. 63/035,845, filed Jun. 8, 2020, and China Application Serial Number 202110208434.0, filed Feb. 24, 2021, the disclosures of which are incorporated herein by reference in their entireties.

BACKGROUND

Technical Field

The present disclosure relates to a fluid connector assembly, a liquid cooling system and a fluid circulation system.

Description of Related Art

Water cooling is widely adopted in computing devices, such as server or PC, to remove heat generated by electronic components such as a processor. Some water cooling systems are modular, meaning that they include multiple sub-systems interconnected via fluid connectors.

Conventionally, the fluid connectors on two subsystems to be connected are fixedly mounted. As mechanical parts inevitably come with variations in physical dimensions, the fixedly mounted fluid connectors may not be properly aligned, in which case the fluid connectors cannot be successfully connected.

SUMMARY

In view of the foregoing, one of the objects of the present invention is to provide a fluid connector assembly whose position can be adjusted to align with a pairing device.

To achieve the objective stated above, in accordance with an embodiment of the present invention, a fluid connector assembly includes a housing, an elastic member and a floating component. The housing has an opening. The elastic member is disposed in the opening of the housing. The floating component is movably supported by the elastic member and includes a fluid passage and a first guiding structure. The fluid passage is configured to be connected to a fluid device. The first guiding structure is configured to engage with a second guiding structure of the fluid device.

In one or more embodiments of the present invention, the elastic member includes a spring with a curved portion. The curved portion is adjacent to the floating component.

In one or more embodiments of the present invention, the floating component has a stopper making contact with the elastic member or the housing.

In one or more embodiments of the present invention, the elastic member includes a first elastic member and a second elastic member. The stopper is located between the first elastic member and the second elastic member.

In one or more embodiments of the present invention, the elastic member includes a curved portion. The stopper includes two locking pins holding the curved portion therebetween.

In one or more embodiments of the present invention, the elastic member has a thru-hole. The stopper passes through the thru-hole and is movably disposed in the thru-hole.

In one or more embodiments of the present invention, the housing has a retaining slot. The stopper is at least partially located in the retaining slot.

In one or more embodiments of the present invention, the elastic member includes a first elastic member and a second elastic member. The floating component includes a middle section located within the opening of the housing. The middle section has a corner portion located between the first elastic member and the second elastic member.

In one or more embodiments of the present invention, the first guiding structure of the floating component is a polygonal guiding hole or D-shaped guiding hole.

In one or more embodiments of the present invention, the elastic member includes a coil spring. The coil spring has a first end and a second end opposite to the first end. The first end is fixedly attached to the housing. The second end is connected to the floating component.

In accordance with an embodiment of the present invention, a fluid circulation system includes a first fluid device, a second fluid device and a fluid connector assembly. The fluid connector assembly includes a housing, an elastic member and a floating component. The housing has an opening. The elastic member is disposed in the opening of the housing. The floating component is movably supported by the elastic member and includes a fluid passage and a first guiding structure. The fluid passage is connected to the first fluid device and the second fluid device. The first guiding structure is configured to engage with a second guiding structure of the second fluid device.

In accordance with an embodiment of the present invention, a liquid cooling system includes a pump system, a heat exchanger and a fluid connector assembly. The fluid connector assembly includes a housing, an elastic member and a floating component. The housing has an opening. The elastic member is disposed in the opening of the housing. The floating component is movably supported by the elastic member and includes a fluid passage and a first guiding structure. The fluid passage is connected to the pump system and the heat exchanger. The first guiding structure is configured to engage with a second guiding structure of the pump system or the heat exchanger.

In sum, the present disclosure provides a spring-loaded fluid connector assembly featured with a floating component movably supported by an elastic member. The floating component is guided by a first guiding structure paired with a second guiding structure to automatically adjust its position, such that the floating component can be more easily connected to a fluid device.

BRIEF DESCRIPTION OF THE DRAWINGS

To make the objectives, features, advantages, and embodiments of the present disclosure, including those mentioned above and others, more comprehensible, descriptions of the accompanying drawings are provided as follows.

DETAILED DESCRIPTION

For the sake of the completeness of the description of the present disclosure, reference is made to the accompanying drawings and the various embodiments described below. Various features in the drawings are not drawn to scale and are provided for illustration purposes only. To provide full understanding of the present disclosure, various practical details will be explained in the following descriptions. However, a person with an ordinary skill in relevant art should realize that the present disclosure can be implemented without one or more of the practical details. Therefore, the present disclosure is not to be limited by these details.

Figure 1:
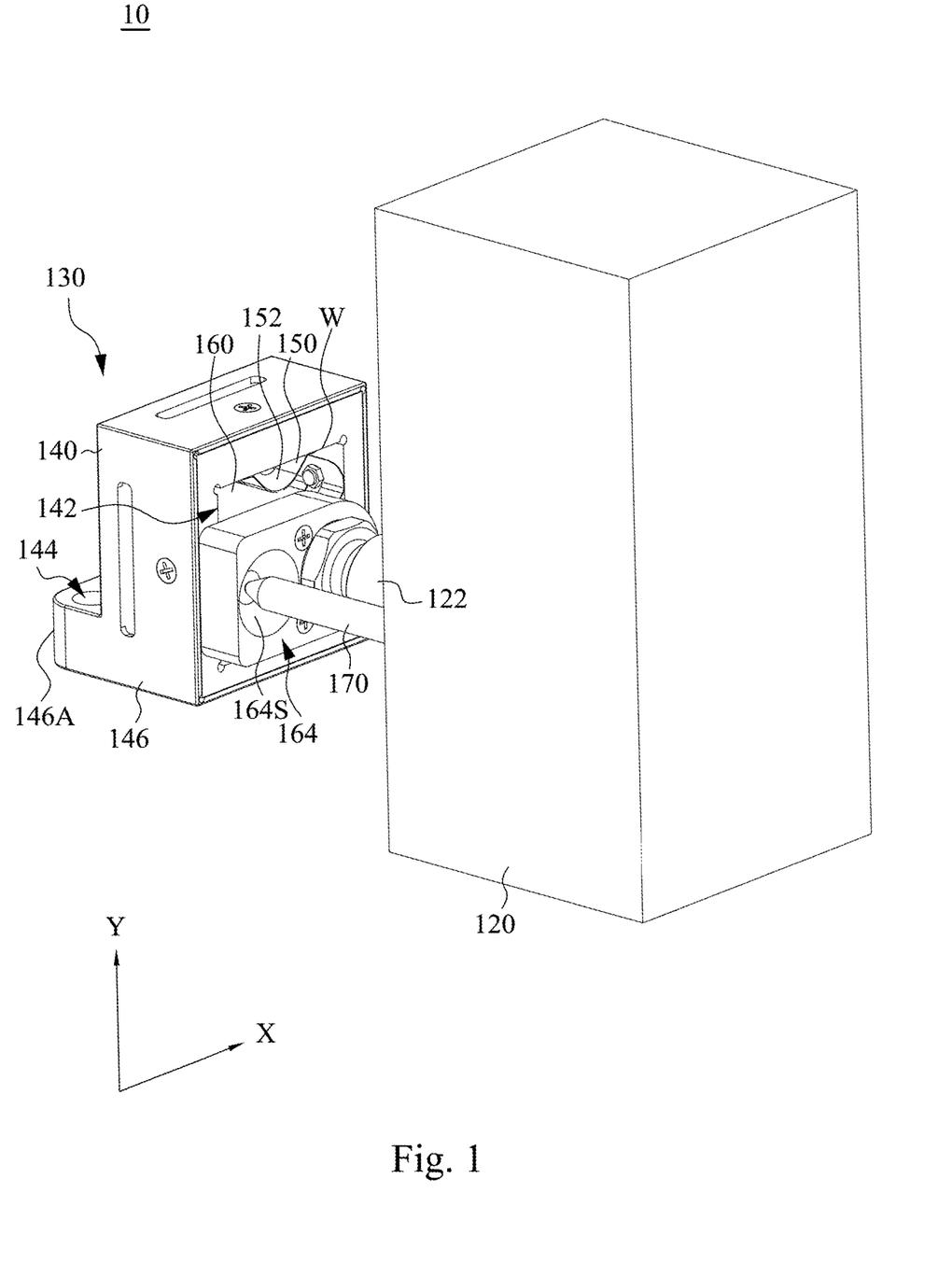
FIG. 1 illustrates an assembled view of a system in accordance with an embodiment of the present disclosure.
Figure 2:
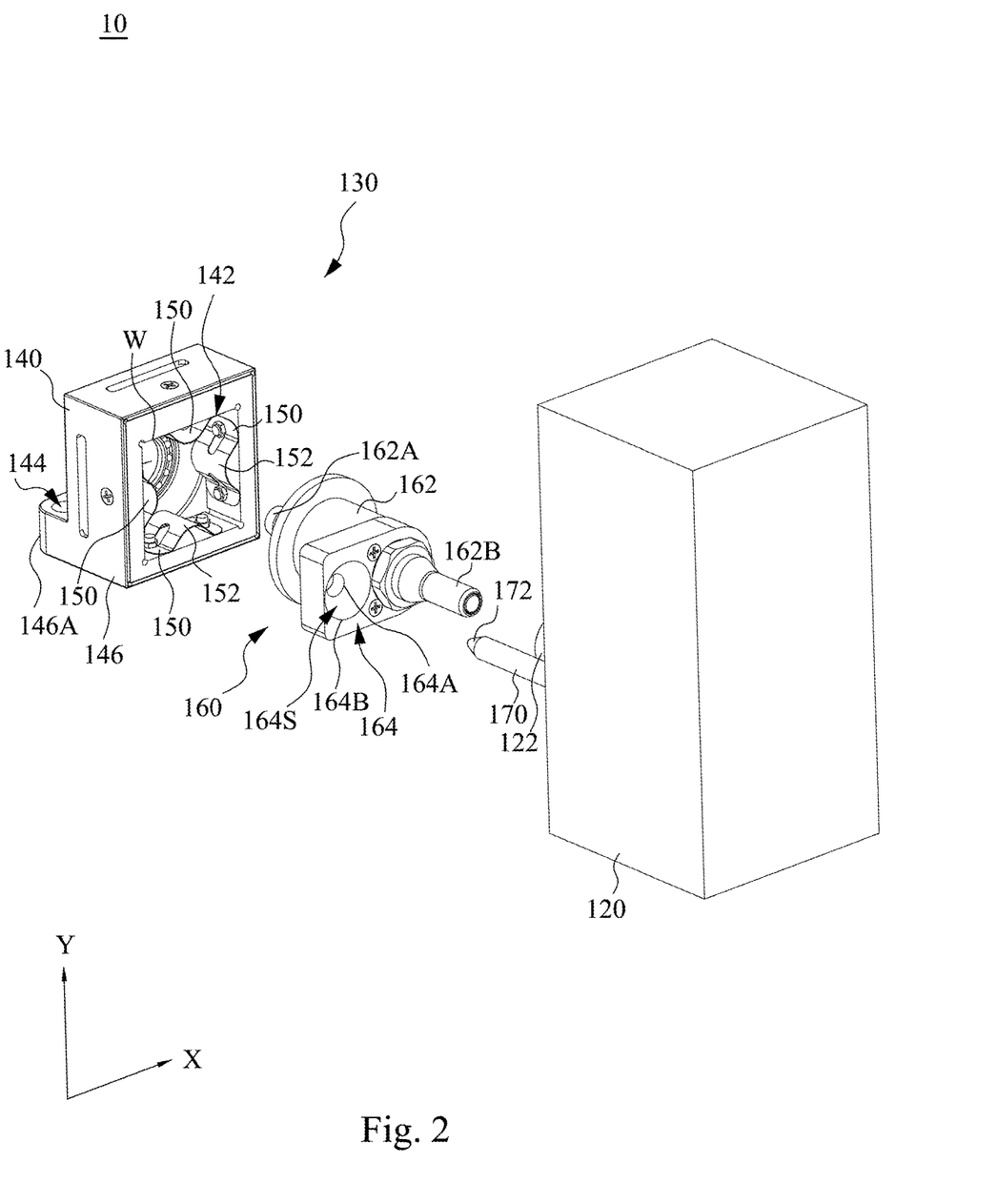
FIG. 2 illustrates an exploded view of the system shown in FIG. 1.
Figure 3:
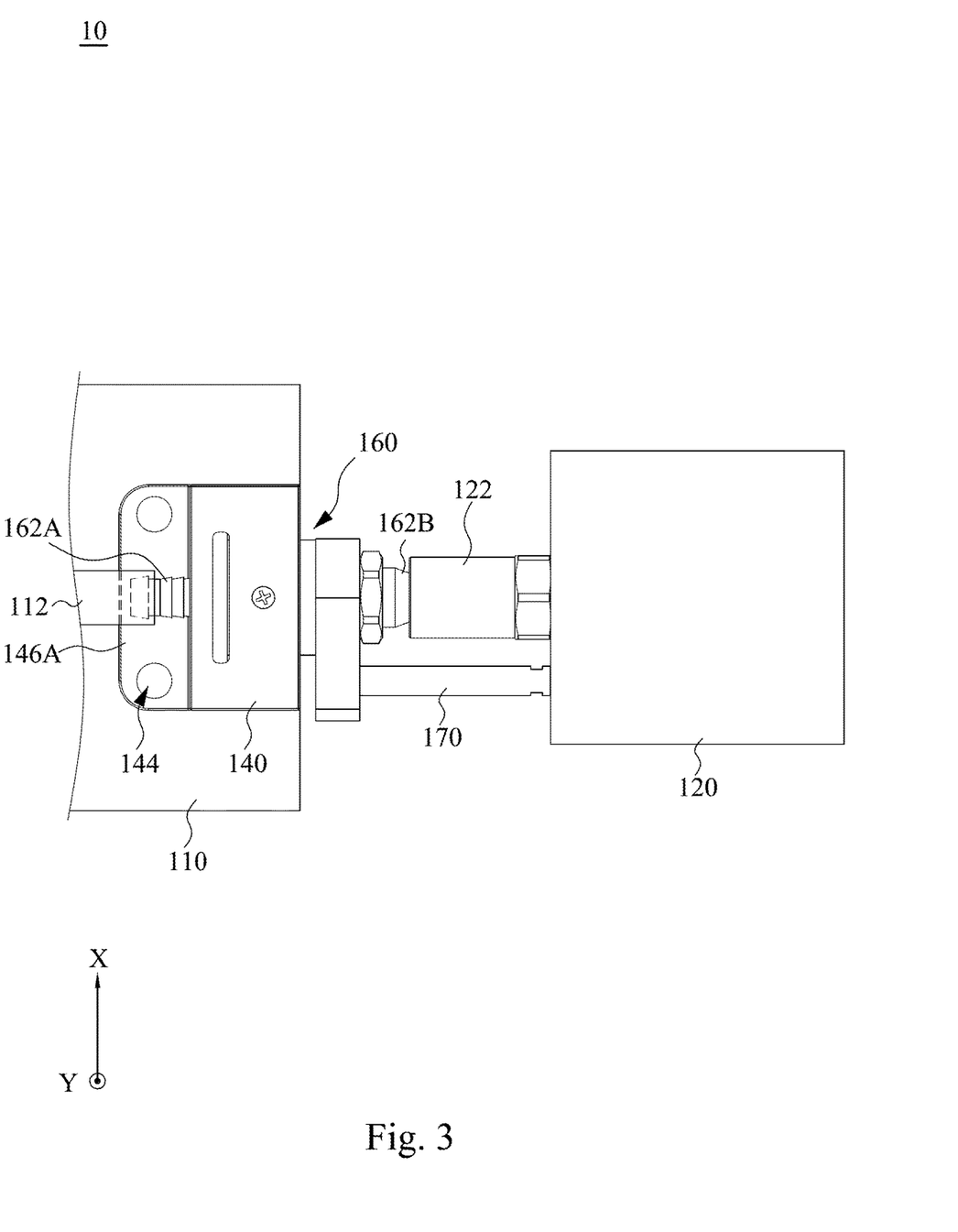
FIG. 3 illustrates a schematic top view of the system shown in FIG. 1.

Reference is made to FIGS. 1 to 3. FIG. 1 illustrates an assembled view of a system 10 in accordance with an embodiment of the present disclosure. FIG. 2 illustrates an exploded view of the system 10 shown in FIG. 1. FIG. 3 illustrates a schematic top view of the system 10 shown in FIG. 1. The system 10 is a fluid circulation system. The system 10 includes a first fluid device 110 (see FIG. 3; omitted in FIGS. 1 and 2), a second fluid device 120, and a fluid connector assembly 130 mounted on the first fluid device 110 and configured to connect the first fluid device 110 to the second fluid device 120. In other words, the fluid connector assembly 130 serves as an adapter between the first fluid device 110 and the second fluid device 120.

In some embodiments, the system 10 is a liquid cooling system configured to circulate a coolant (e.g., water). In such embodiments, the first fluid device 110 may include a pump system and the second fluid device 120 may include a heat exchanger (e.g., a radiator), or the other way around. In a more specific embodiment, the first fluid device 110 circulates coolant inside a server, and the second fluid device 120 is a manifold installed on a server rack. When the server is mounted on the server rack, the first fluid device 110 is connected to the manifold of the server rack via the fluid connector assembly 130 to complete a liquid cooling loop.

The fluid connector assembly 130 includes a housing 140, one or more elastic members 150 (preferably four, as in the illustrated embodiment) and a floating component 160. The housing 140 may be fixedly mounted on the first fluid device 110 and has an opening 142. The floating component 160 is disposed in the opening 142 of the housing 140. The elastic members 150 are disposed in the opening 142 of the housing 140 and are preferably located between the housing 140 and the floating component 160, so as to support the floating component 160 and to enable the floating component 160 to move within a predefined range in the opening 142.

In some embodiments, the fluid connector assembly 130 includes two elastic members 150 arranged on opposite sides of the floating component 160 in a direction X, such that the position of the floating component 160 is adjustable in the direction X. In some embodiments, the fluid connector assembly 130 may further include one or more elastic members 150 arranged in a direction Y normal to the direction X, such that the position of the floating component 160 is adjustable in both the directions X and Y.

In some embodiments, the housing 140 has inner walls W surrounding the opening 142, and the elastic members 150 are mounted on the inner walls W of the housing 140. In some embodiments, the elastic members 150 are attached to the housing 140 by means of screwing.

In some embodiments, the elastic members 150 are springs each having a curved portion 152 adjacent to the floating component 160. The curved portion 152 points towards the floating component 160 and is configured to abut against the floating component 160. The curved portion 152 is separated from the corresponding inner wall W of the housing 140 by a gap. The curved portion 152 is configured to be pushed towards the inner walls W by the floating component 160 as the floating component 160 moves towards the inner walls W.

In some embodiments, the housing 140 includes one or more mounting holes 144 each configured to receive a fastener (e.g., screw), such that the housing 140 can be fixedly attached to the first fluid device 110. In some embodiments, the housing 140 has a base portion 146 beneath the opening 142, and the mounting holes 144 are formed on the base portion 146. In some embodiments, the base portion 146 of the housing 140 includes an extending portion 146A, and the mounting holes 144 are formed on the extending portion 146A.

The floating component 160 includes a fluid passage 162. The fluid passage 162 includes a first end 162A and a second end 162B opposite to the first end 162A. The first end 162A and the second end 162B of the fluid passage 162 are connected to the first fluid device 110 and the second fluid device 120 respectively. Specifically, the first fluid device 110 includes a port 112 (e.g., a connector or a tube) connected to the first end 162A of the fluid passage 162, and the second fluid device 120 includes a port 122 (e.g., a connector or a tube) connected to the second end 162B of the fluid passage 162.

In some embodiments, the first end 162A and the second end 162B of the fluid passage 162 are both located outside the opening 142 of the housing 140. In some embodiments, the first end 162A and the second end 162B of the fluid passage 162 are located on the rear side and the front side of the opening 142 respectively. In some embodiments, the first end 162A or the second end 162B of the fluid passage 162 is a detachable tube. The first end 162A and the second end 162B may be connected inside the fluid passage 162, or may be connected via the fluid passage 162.

The floating component 160 further includes a first guiding structure 164. The first guiding structure 164 is positioned on a side of the second end 162B of the fluid passage 162 and is configured to engage with a second guiding structure 170 of the second fluid device 120.

In some embodiments, the first guiding structure 164 is a guiding hole with an inclined inner surface 164S, and second guiding structure 170 is a guiding pin. The second end 162B of the fluid passage 162 is brought into alignment (and further into connection) with the port 122 of the second fluid device 120 as the second guiding structure 170 enters the first guiding structure 164.

Specifically, in the process of connecting the fluid connector assembly 130 to the second fluid device 120, if the second guiding structure 170 is not aligned with the center of the first guiding structure 164, the second guiding structure 170 would contact the inclined inner surface 164S of the first guiding structure 164. The floating component 160 is moved by the second guiding structure 170 as the second guiding structure 170 slides along the inclined inner surface 164S, until the second end 162B of the fluid passage 162 aligns with the port 122 of the second fluid device 120, such that the fluid passage 162 can be easily connected to the second fluid device 120.

By this arrangement, the second guiding structure 170 and the first guiding structure 164 can guide the movement of the floating component 160 to compensate for potential misalignment between the first fluid device 110 and the second fluid device 120. As a result, the first fluid device 110 and the second fluid device 120 can be successfully connected via the fluid connector assembly 130 even when they are not properly aligned.

In some embodiments, the elastic members 150 are configured to return the floating component 160 to its originally position (e.g., at the center of the opening 142) when the floating component 160 is disconnected from the second fluid device 120 and the second guiding structure 170 disengages from the first guiding structure 164.

In some embodiments, the first guiding structure 164 has a first boundary 164A and a second boundary 164B. The inclined inner surface 164S of the first guiding structure 164 is connected between the first boundary 164A and the second boundary 164B. The first boundary 164A is located between the second boundary 164B and the housing 140, and the first boundary 164A is smaller than the second boundary 164B. In some embodiments, the first guiding structure 164 is a circular guiding hole or a polygonal guiding hole. For example, both the first boundary 164A and the second boundary 164B of the first guiding structure 164 are circular. In some embodiments, the second guiding structure 170 has a tapered end 172 facing the first guiding structure 164.

Figure 4:
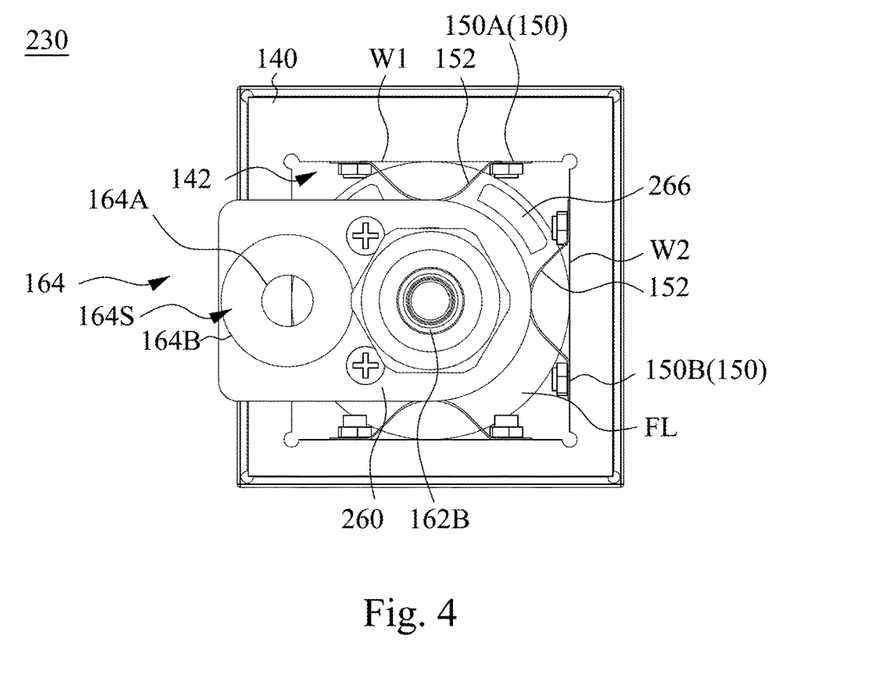
FIG. 4 illustrates a front view of a fluid connector assembly in accordance with another embodiment of the present disclosure.
Figure 5:
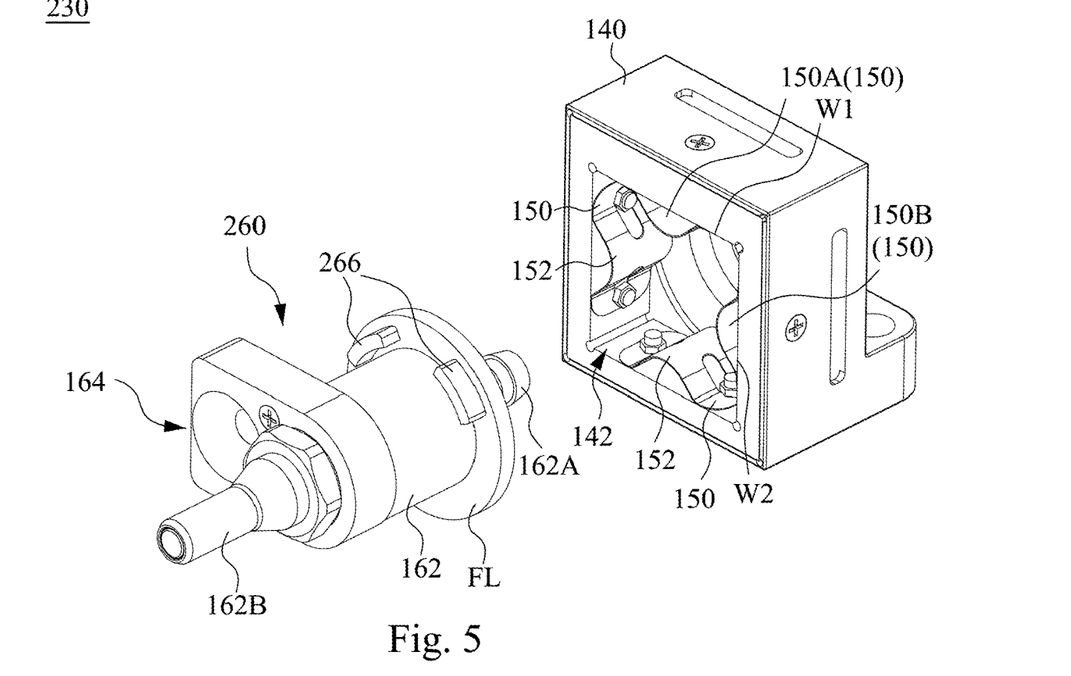
FIG. 5 illustrates an exploded view of the fluid connector assembly shown in FIG. 4.

Reference is made to FIGS. 4 and 5. FIG. 4 illustrates a front view of a fluid connector assembly 230 in accordance with another embodiment of the present disclosure. FIG. 5 illustrates an exploded view of the fluid connector assembly 230 shown in FIG. 4. The present embodiment differs from the embodiment shown in FIGS. 1 to 3 in that the floating component 260 has at least one stopper 266. The stopper 266 may be impeded by the elastic members 150 to prevent the floating component 260 from rotating. As a result, the first guiding structure 164 of the floating component 260 can successfully engage with the second guiding structure 170 to guide the movement of the floating component 260. The stopper 266 may prevent the floating component 260 from rotating by making contact with the elastic member 150 or with the housing 140.

In some embodiments, the housing 140 includes a first inner wall W1 and a second inner wall W2 adjoining the first inner wall W1. The elastic members 150 include a first elastic member 150A disposed on the first inner wall W1 and a second elastic member 150B disposed on the second inner wall W1. The stopper 266 is located between the first elastic member 150A and the second elastic member 150B. Specifically, the stopper 266 is located between the curved portions 152 of the first elastic member 150A and the second elastic member 150B.

In some embodiments, the stopper 266 includes one or more bumps. In some embodiments, the floating component 260 includes a flange FL on a side of the elastic members 150 (e.g., the flange FL is behind the elastic members 150 under front view). The stopper 266 may be disposed on an outer wall of the fluid passage 162 or on the flange FL. The stopper 266 extends into a gap between the first elastic member 150A and the second elastic member 150B.

Figure 6:
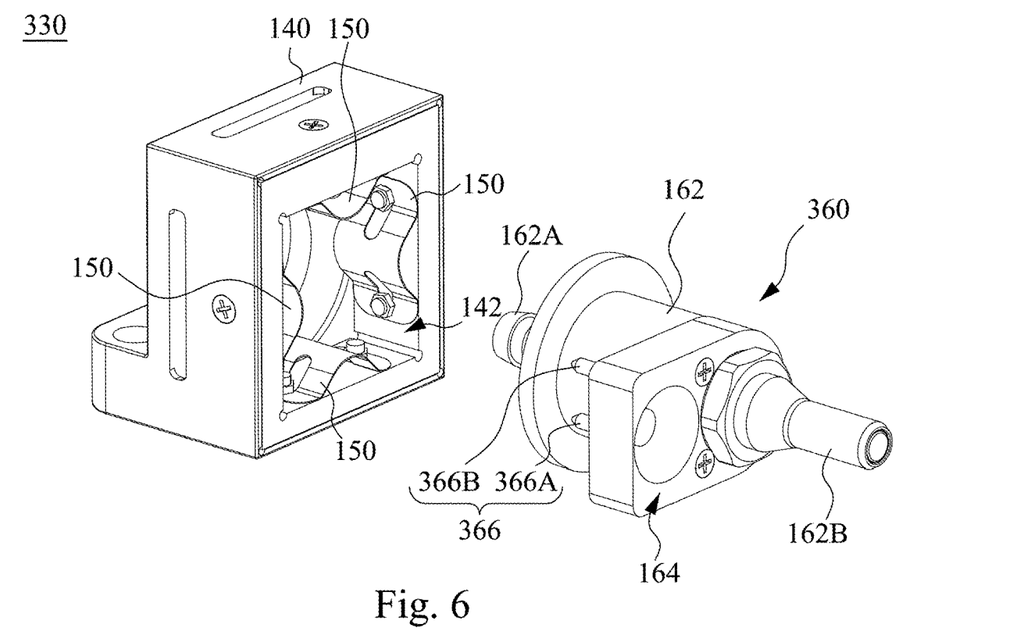
FIG. 6 illustrates an exploded view of a fluid connector assembly in accordance with another embodiment of the present disclosure.
Figure 7:
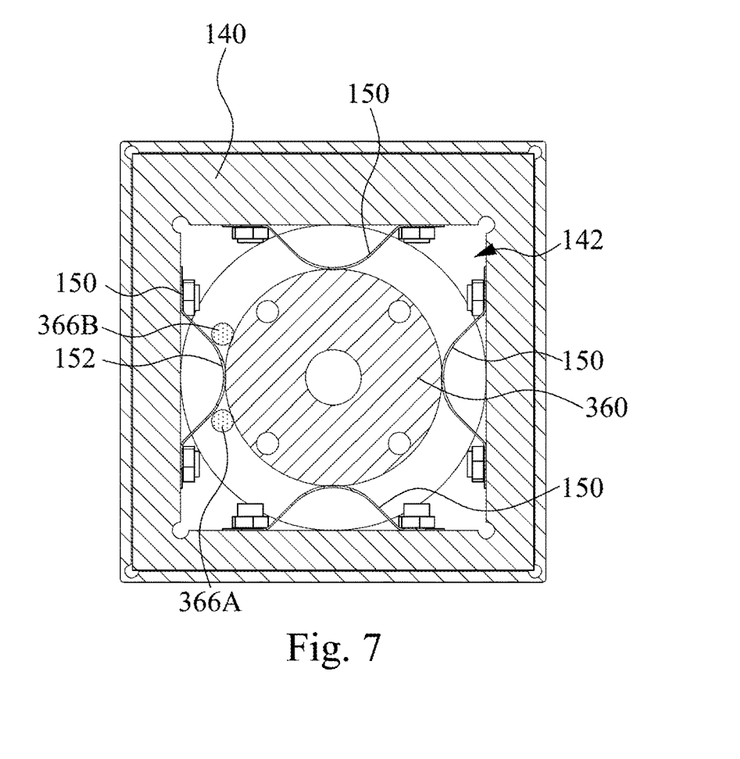
FIG. 7 illustrates a sectional view of the fluid connector assembly shown in FIG. 6.

Reference is made to FIGS. 6 and 7. FIG. 6 illustrates an exploded view of a fluid connector assembly 330 in accordance with another embodiment of the present disclosure. FIG. 7 illustrates an assembled sectional view of the fluid connector assembly 330 shown in FIG. 6. The present embodiment differs from the embodiments discussed previously in that the stopper 366 of the floating component 360 includes two locking pins 366A and 366B. The two locking pins 366A and 366B may be located on opposite sides of any one of the elastic members 150. Preferably, the two locking pins 366A and 366B are located on opposite sides of the curved portion 152 of any one of the elastic members 150. Alternatively, the two locking pins 366A and 366B may be located between two immediately adjacent elastic members 150, and the two locking pins 366A and 366B are positioned in proximity to the two elastic members 150 respectively. By this arrangement, rotation motion of the floating component 360 can be effectively prevented.

In some embodiments, the pins 366A and 366B protrude from a backside of the first guiding structure 164 and extend into the opening 142 of the housing 140. The pins 366A and 366B are separated from each other, creating a space therebetween to hold the curved portion 152 of the corresponding elastic member 150.

Figure 8:
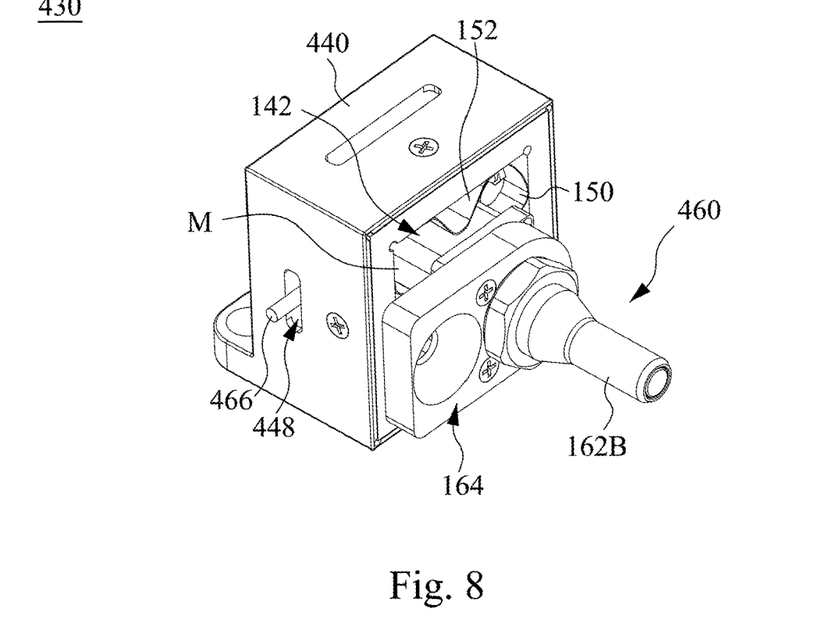
FIG. 8 illustrates a perspective view of a fluid connector assembly in accordance with another embodiment of the present disclosure.
Figure 9:
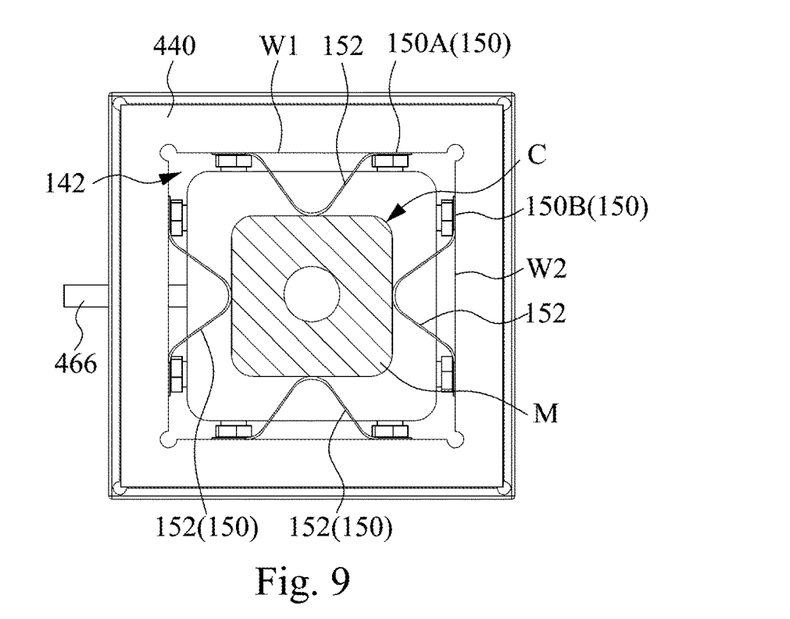
FIG. 9 illustrates a sectional view of the fluid connector assembly shown in FIG. 8.

Reference is made to FIGS. 8 and 9. FIG. 8 illustrates a perspective view of a fluid connector assembly 430 in accordance with another embodiment of the present disclosure. FIG. 9 illustrates a sectional view of the fluid connector assembly 430 shown in FIG. 8. The present embodiment differs from the embodiments discussed previously in that the stopper 466 of the floating component 460 makes contact with the housing 440 to limit the rotation of the floating component 460.

Specifically, the housing 440 has a retaining slot 448 communicating with the opening 142. The floating component 460 includes a middle section M located within the opening 142 of the housing 440. The stopper 466 is in a form of a pin or a post. The stopper 466 protrudes from the middle section M or the flange FL of the floating component 460 and extends into the retaining slot 448.

In some embodiments, the retaining slot 448 is formed on a part of the housing 440 not covered by the elastic members 150. In other words, orthogonal projections of the elastic members 150 on the inner walls W of the housing 440 are spaced apart from (i.e., do not overlap with) the retaining slot 448. For example, the retaining slot 448 may be formed on a side of one of the elastic members 150 or between two elastic members 150.

In some embodiments, the retaining slot 448 is a thru-hole. After the floating component 460 is fitted into the opening 142 of the housing 440, the stopper 466 can be attached to the middle section M of the floating component 460 from the outer side of the housing 440 by inserting the stopper 466 into the thru-hole.

In some embodiments, the middle section M of the floating component 460 is shaped in a way such that the middle section M has a corner portion C located between two immediately adjacent elastic members 150. Specifically, the corner portion C is located between the curved portions 152 of the first elastic member 150A and the second elastic member 150B. By this arrangement, the engagement between the corner portion C and the elastic members 150 can effectively limit the rotation of the floating component 460. In some embodiments, the middle section M of the floating component 460 has a polygonal profile, such as a rectangular profile, and each of the four corner portions C of the middle section M is located between two immediately adjacent elastic members 150.

Although the floating component 460 is exemplified as including both the stopper 466 and the middle section M with the corner portion C between two of the elastic members 150, the present disclosure is not limited to said configuration. In alternative embodiments, the floating component 460 can be featured with either the stopper 466 or the middle section M with the corner portion C between two of the elastic members 150.

Figure 10:
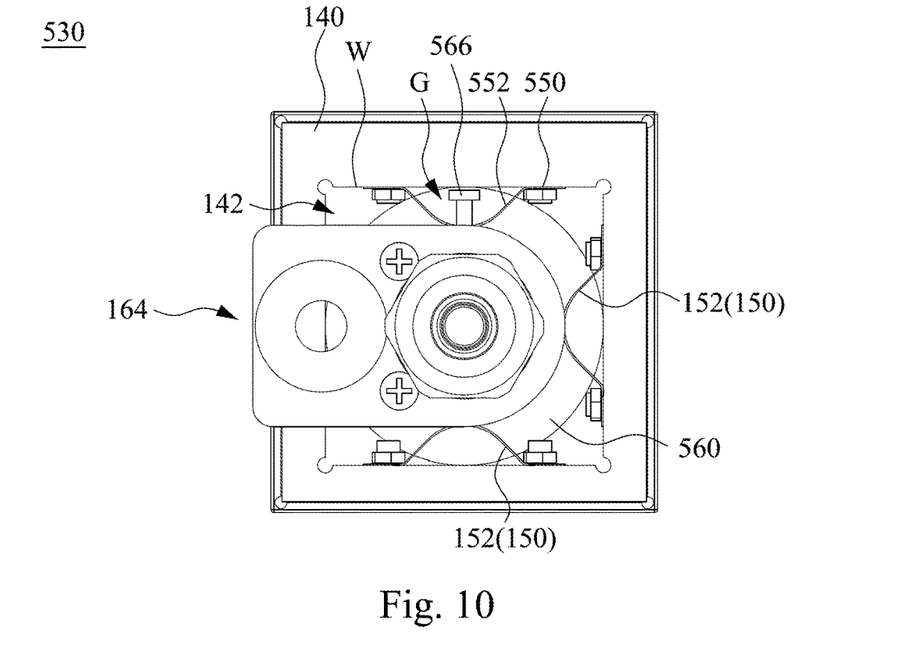
FIG. 10 illustrates a front view of a fluid connector assembly in accordance with another embodiment of the present disclosure.

Reference is made to FIG. 10, which illustrates a front view of a fluid connector assembly 530 in accordance with another embodiment of the present disclosure. The present embodiment differs from the embodiments discussed previously in that the stopper 566 of the floating component 560 passes through one of the elastic members and is movably disposed in said elastic member (e.g., elastic member 550).

In some embodiments, the elastic member 550 has a thru-hole (not visible under front view of the fluid connector assembly 530) on the curved portion 552. The stopper 566 protrudes from the middle section of the floating component 560 and passes through the thru-hole into a gap G between the curved portion 552 and the corresponding inner wall W. The stopper 566 is movably disposed in the thru-hole of the elastic member 550. In some embodiments, the stopper 566 includes a hook structure.

Figure 11:
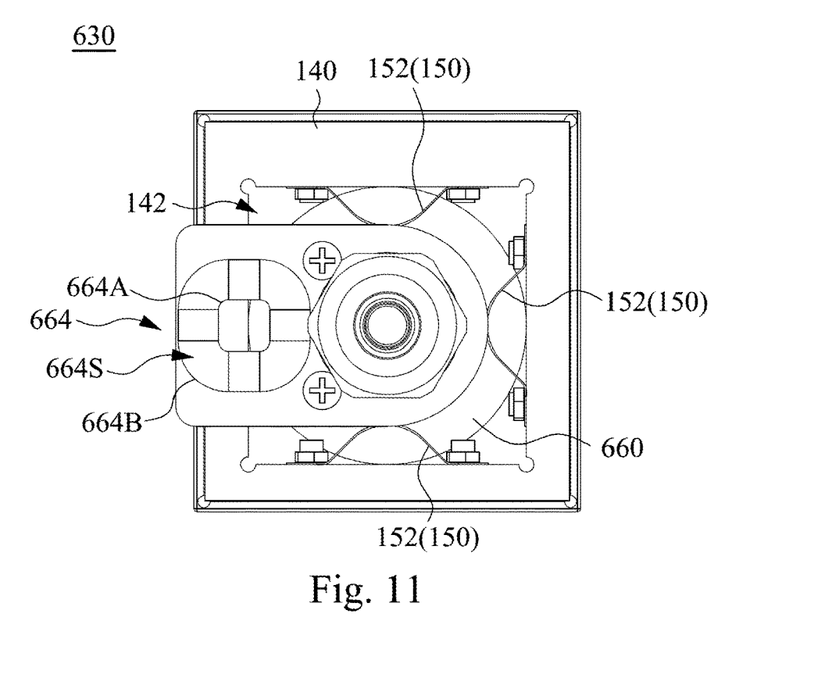
FIG. 11 illustrates a front view of a fluid connector assembly in accordance with another embodiment of the present disclosure.

Reference is made to FIG. 11, which illustrates a front view of a fluid connector assembly 630 in accordance with another embodiment of the present disclosure. The present embodiment differs from the embodiments discussed previously in that the first guiding structure 664 of the floating component 660 is a polygonal guiding hole (a rectangular guiding hole in the illustrated embodiment). In other words, both the first boundary 664A and the second boundary 664B of the first guiding structure 664 are polygons (optionally configured to have rounded corners). The inclined inner surface 664S of the first guiding structure 664 is connected between the first boundary 664A and the second boundary 664B.

Figure 12:
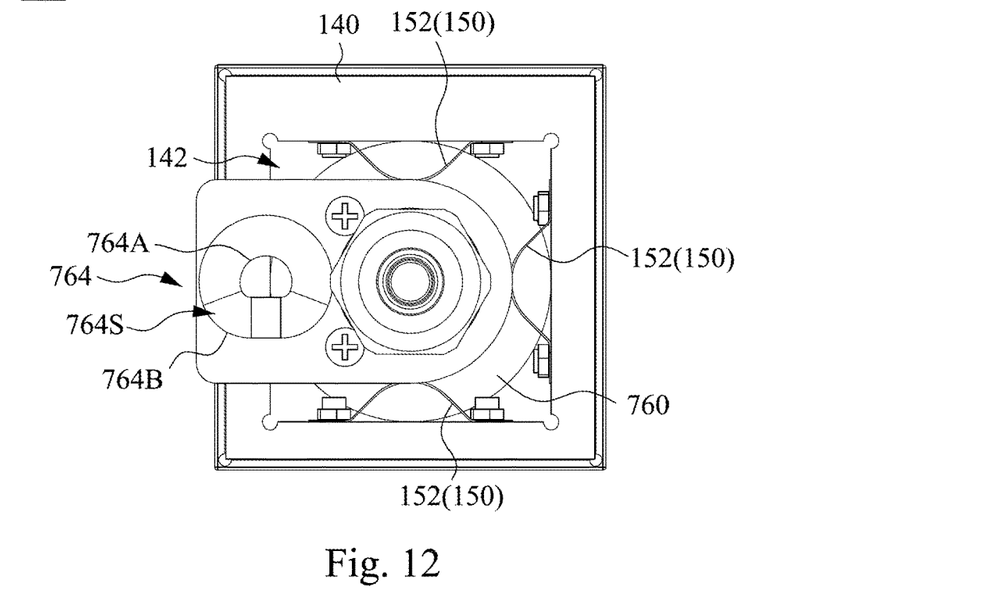
FIG. 12 illustrates a front view of a fluid connector assembly in accordance with another embodiment of the present disclosure.

Reference is made to FIG. 12, which illustrates a front view of a fluid connector assembly 730 in accordance with another embodiment of the present disclosure. The present embodiment differs from the embodiments discussed previously in that the first guiding structure 764 of the floating component 760 is a D-shaped guiding hole. In other words, the first boundary 764A and the second boundary 764B of the first guiding structure 764 each includes a substantially straight section and a curved section connected to each other. The inclined inner surface 764S of the first guiding structure 764 is connected between the first boundary 764A and the second boundary 764B. With the D-shaped first guiding structure 764, the rotational motion of the floating component 760 can be restrained.

Figure 13:
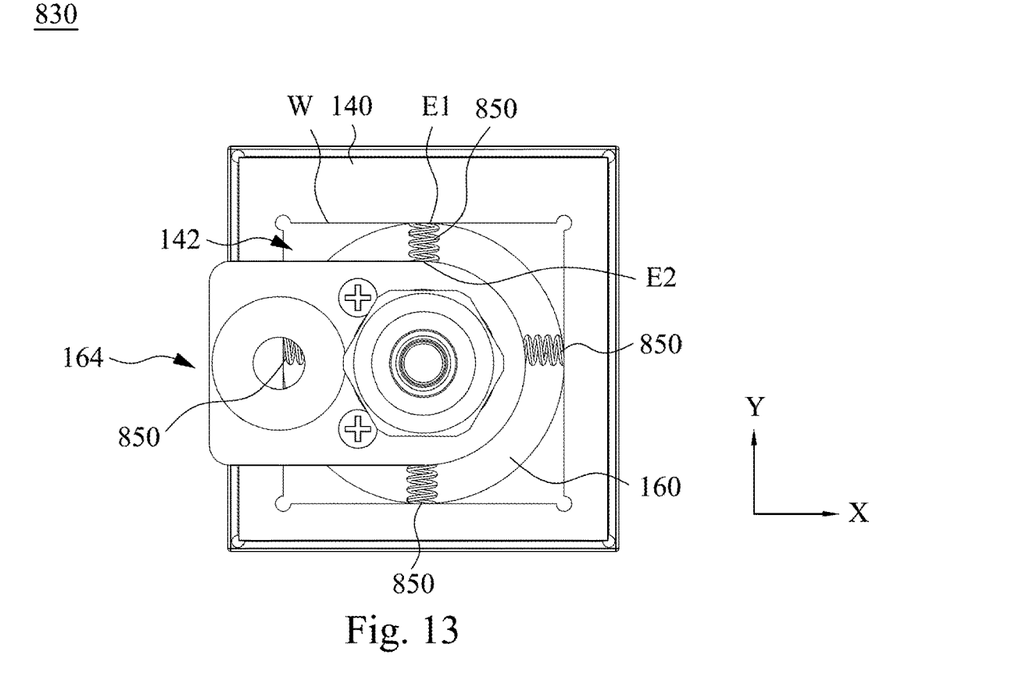
FIG. 13 illustrates a front view of a fluid connector assembly in accordance with another embodiment of the present disclosure.

Reference is made to FIG. 13, which illustrates a front view of a fluid connector assembly 830 in accordance with another embodiment of the present disclosure. The present embodiment differs from the embodiments discussed previously in that the elastic members 850 are coil springs. Each of the coil springs has a first end E1 and a second end E2 opposite to the first end E1. The first end E1 is fixedly attached to one of the inner walls W of the housing 140, and the second end E2 is connected to the floating component 160 (e.g., the second end E2 slidably abuts against the floating component 160).

In some embodiments, the fluid connector assembly 830 includes two elastic members 850 extending in the direction X and being arranged on opposite sides of the floating component 160 in the direction X, such that the position of the floating component 160 is adjustable in the direction X. In some embodiments, the fluid connector assembly 830 further includes two elastic members 850 extending in the direction Y and being arranged on opposite sides of the floating component 160 in the direction Y, such that the position of the floating component 160 is adjustable in both the directions X and Y.

In sum, the present disclosure provides a spring-loaded fluid connector assembly featured with a floating component movably supported by an elastic member. The floating component is guided by a first guiding structure paired with a second guiding structure to automatically adjust its position, such that the floating component can be more easily connected to a fluid device.

Although the present disclosure has been described by way of the exemplary embodiments above, the present disclosure is not to be limited to those embodiments. Any person skilled in the art can make various changes and modifications without departing from the spirit and the scope of the present disclosure. Therefore, the protective scope of the present disclosure shall be the scope of the claims as attached.

What is claimed is:

1. A fluid connector assembly, comprising:
a housing having an opening;
an elastic member disposed in the opening of the housing; and
a floating component movably supported by the elastic member and comprising a fluid passage and a first guiding structure, wherein the fluid passage is configured to be connected to a fluid device, and the first guiding structure is configured to engage with a second guiding structure of the fluid device.

2. The fluid connector assembly of claim 1, wherein the elastic member comprises a spring with a curved portion, the curved portion is adjacent to the floating component.

3. The fluid connector assembly of claim 1, wherein the floating component has a stopper making contact with the elastic member or the housing.

4. The fluid connector assembly of claim 3, wherein the elastic member comprises a first elastic member and a second elastic member, and the stopper is located between the first elastic member and the second elastic member.

5. The fluid connector assembly of claim 3, wherein the elastic member comprises a curved portion, the stopper comprises two locking pins holding the curved portion therebetween.

6. The fluid connector assembly of claim 3, wherein the elastic member has a thru-hole, the stopper passes through the thru-hole and is movably disposed in the thru-hole.

7. The fluid connector assembly of claim 3, wherein the housing has a retaining slot, and the stopper is at least partially located in the retaining slot.

8. The fluid connector assembly of claim 1, wherein the elastic member comprises a first elastic member and a second elastic member, the floating component comprises a middle section located within the opening of the housing, the middle section has a corner portion located between the first elastic member and the second elastic member.

9. The fluid connector assembly of claim 1, wherein the first guiding structure is a polygonal guiding hole or D-shaped guiding hole.

10. The fluid connector assembly of claim 1, wherein the elastic member comprises a coil spring, the coil spring has a first end and a second end opposite to the first end, the first end is fixedly attached to the housing, the second end is connected to the floating component.

11. A fluid circulation system, comprising:
   a first fluid device;
   a second fluid device; and
   a fluid connector assembly, comprising:
      a housing having an opening;
      an elastic member disposed in the opening of the housing; and
      a floating component movably supported by the elastic member and having a fluid passage and a first guiding structure, wherein the fluid passage is connected to the first fluid device and the second fluid device, and the first guiding structure is configured to engage with a second guiding structure of the second fluid device.

12. The fluid circulation system of claim 11, wherein the elastic member comprises a first elastic member and a second elastic member, the floating component has a stopper located between the first elastic member and the second elastic member.

13. The fluid circulation system of claim 11, wherein the elastic member comprises a curved portion, and the floating component has two locking pins holding the curved portion therebetween.

14. The fluid circulation system of claim 11, wherein the elastic member has a thru-hole, the floating component has a stopper passing through the thru-hole and movably disposed in the thru-hole.

15. The fluid circulation system of claim 11, wherein the housing has a retaining slot, and the floating component has a stopper at least partially located in the retaining slot.

16. A liquid cooling system, comprising:
   a pump system;
   a heat exchanger; and
   a fluid connector assembly, comprising:
      a housing having an opening;
      an elastic member disposed in the opening of the housing; and
      a floating component movably supported by the elastic member and having a fluid passage and a first guiding structure, wherein the fluid passage is connected to the pump system and the heat exchanger, and the first guiding structure is configured to engage with a second guiding structure of the pump system or the heat exchanger.

17. The liquid cooling system of claim 16, wherein the elastic member comprises a first elastic member and a second elastic member, the floating component has a stopper located between the first elastic member and the second elastic member.

18. The liquid cooling system of claim 16, wherein the elastic member comprises a curved portion, and the floating component has two locking pins holding the curved portion therebetween.

19. The liquid cooling system of claim 16, wherein the elastic member has a thru-hole, the floating component has a stopper passing through the thru-hole and movably disposed in the thru-hole.

20. The liquid cooling system of claim 16, wherein the housing has a retaining slot, and the floating component has a stopper at least partially located in the retaining slot.

* * * * *